United States Patent
Jaffrey

(10) Patent No.: US 10,578,441 B2
(45) Date of Patent: Mar. 3, 2020

(54) SUBSEA NAVIGATION SYSTEMS AND METHODS

(71) Applicant: Cameron International Corporation, Houston, TX (US)

(72) Inventor: Andrew Jaffrey, Oldmeldrum (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 203 days.

(21) Appl. No.: 15/087,652

(22) Filed: Mar. 31, 2016

(65) Prior Publication Data

US 2017/0284806 A1    Oct. 5, 2017

(51) Int. Cl.
*G01C 21/20* (2006.01)
*B63G 8/00* (2006.01)

(52) U.S. Cl.
CPC ...... *G01C 21/203* (2013.01); *B63G 2008/005* (2013.01)

(58) Field of Classification Search
CPC .................................. G01C 21/20; B63G 8/00
See application file for complete search history.

(56) References Cited

U.S. PATENT DOCUMENTS

| | | | | |
|---|---|---|---|---|
| 4,070,671 A * | 1/1978 | Morrow | ..................... | G01S 5/26 367/6 |
| 4,097,837 A * | 6/1978 | Cyr | ..................... | G01S 7/52004 367/13 |
| 4,188,629 A * | 2/1980 | Johnson | ................. | G01S 13/753 342/134 |
| 4,809,005 A * | 2/1989 | Counselman, III | .... | G01C 15/00 342/352 |
| 4,951,263 A * | 8/1990 | Shope | ..................... | G01S 1/725 367/117 |
| 5,047,990 A | 9/1991 | Gafos et al. | | |
| 5,168,473 A * | 12/1992 | Parra | ..................... | G01S 3/802 367/118 |
| 5,231,609 A * | 7/1993 | Gaer | ..................... | G01S 15/00 367/117 |
| 7,584,711 B1 * | 9/2009 | Healy | ..................... | B63C 11/46 114/315 |
| 7,853,206 B2 * | 12/2010 | Rhodes | ................. | H04B 13/02 340/850 |
| 2004/0114466 A1 * | 6/2004 | Alliot | ..................... | G01S 5/186 367/99 |
| 2005/0099891 A1 * | 5/2005 | Protoolis | ................... | G01S 5/18 367/118 |
| 2006/0250894 A1 * | 11/2006 | Alliot | ..................... | G01S 5/186 367/96 |

(Continued)

*Primary Examiner* — Jelani A Smith
*Assistant Examiner* — Majdi Alsomiri
(74) *Attorney, Agent, or Firm* — Helene Raybaud

(57) ABSTRACT

A navigation system includes a support structure configured to be positioned at a sea floor. The navigation system also includes multiple transducers coupled to the support structure at fixed locations and configured to emit multiple reference signals. The navigation system further includes a transducer coupled to a movable subsea vessel and configured to receive the plurality of reference signals. A controller includes a processor and a memory, and the processor is configured to determine a position of the movable subsea vessel relative to the support structure based on the multiple reference signals.

15 Claims, 3 Drawing Sheets

(56) References Cited

U.S. PATENT DOCUMENTS

| | | | | |
|---|---|---|---|---|
| 2010/0212573 A1* | 8/2010 | Hawkes | ............ | B63B 22/24 |
| | | | | 114/328 |
| 2012/0275274 A1* | 11/2012 | Gochnour | ............ | H04B 11/00 |
| | | | | 367/134 |
| 2012/0294114 A1* | 11/2012 | Gochnour | ............ | E21B 43/0122 |
| | | | | 367/13 |
| 2014/0123746 A1* | 5/2014 | Jaffrey | ............ | E21B 47/0001 |
| | | | | 73/152.18 |
| 2014/0301161 A1* | 10/2014 | Brizard | ............ | B63G 8/001 |
| | | | | 367/15 |
| 2015/0117716 A1* | 4/2015 | Ursin | ............ | G06T 7/80 |
| | | | | 382/106 |
| 2016/0121983 A1* | 5/2016 | Rokkan | ............ | B63B 27/16 |
| | | | | 114/313 |
| 2016/0195626 A1* | 7/2016 | Rinnan | ............ | G01V 1/3835 |
| | | | | 367/17 |
| 2017/0131424 A1* | 5/2017 | Olsson | ............ | G01V 3/165 |

\* cited by examiner

SUBSEA NAVIGATION SYSTEMS AND METHODS

FIELD OF THE INVENTION

The present invention generally relates to subsea navigation systems and methods.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to a myriad of other uses. Once a desired resource is discovered below the surface of the earth, drilling and production systems are often employed to access and extract the resource. These systems may be located onshore or offshore depending on the location of a desired resource.

Offshore drilling operations traditionally use a combination of surface equipment (e.g., floating vessels or platforms) and subsea equipment to access and extract the resource from the subsea well. In some circumstances, underwater vehicles may be used to inspect and/or to monitor the subsea equipment or the well. Therefore, it would be desirable to provide an efficient and reliable subsea navigation system to facilitate control and/or movement of underwater vehicles.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
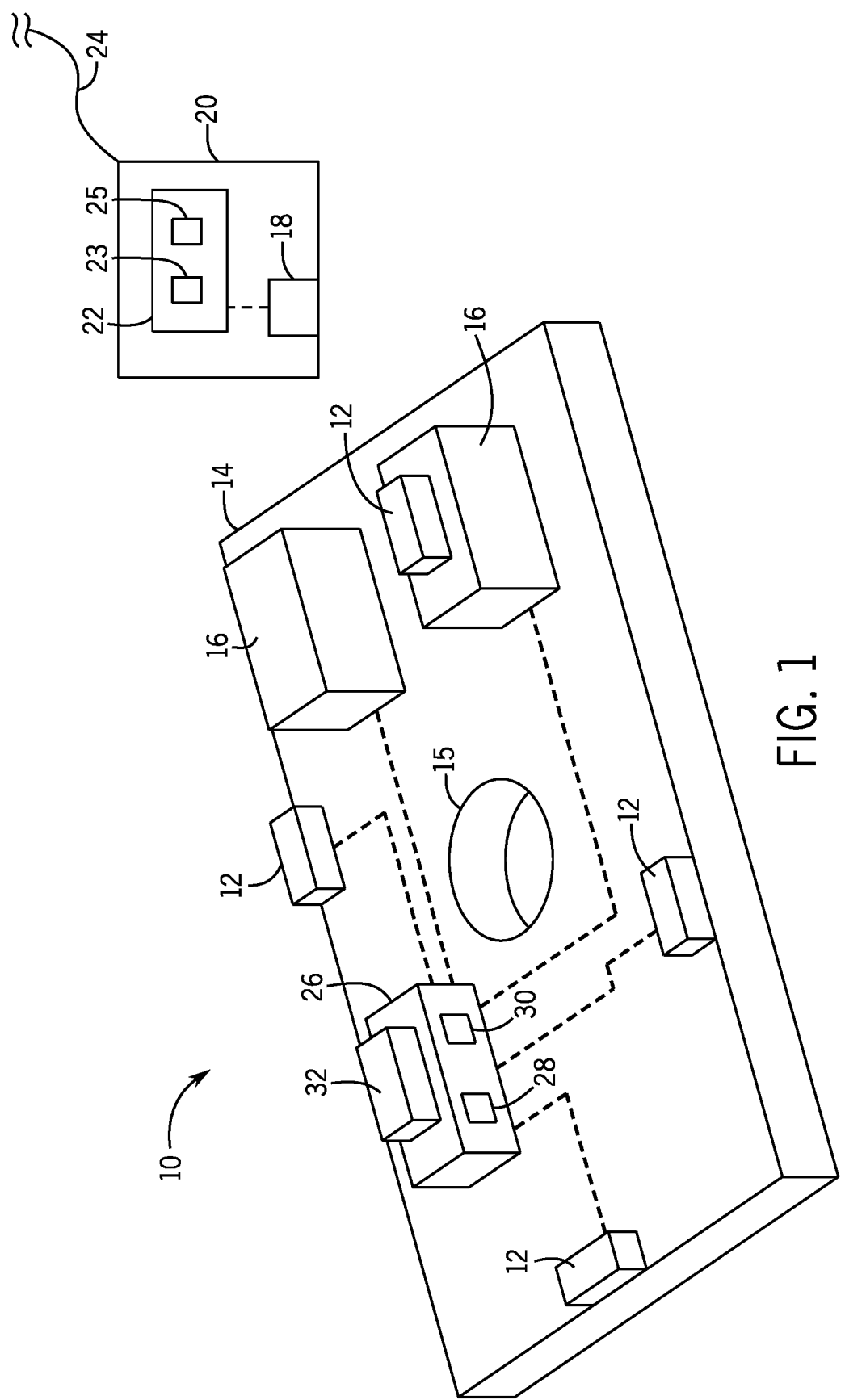
FIG. 1 is a schematic view of an embodiment of a subsea navigation system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments generally relate to subsea navigation systems and methods. The subsea navigation systems and methods disclosed herein may facilitate controlling and/or monitoring underwater vehicles (e.g., remotely operated vehicles (ROV) or autonomous underwater vehicles (AUV)). In certain embodiments, the subsea navigation system disclosed herein includes multiple reference elements (e.g., reference transducers) configured to emit a signal and couple to a skid (e.g., frame, support structure, platform, or the like). In certain embodiments, the underwater vehicle includes a communication element (e.g., transducer) configured to receive signals from the multiple reference elements. Because the location of each of the multiple reference elements on the skid is determined or known prior to subsea deployment of the skid, signals received at the communication element from the multiple reference elements may enable a control system (e.g., electronic controller having a processor and a memory) to determine a position (e.g., a relative position) of the underwater vehicle relative to the skid.

The disclosed subsea navigation system may be particularly useful in certain subsea hydrocarbon extraction systems in which the skid supports various tools or other components (e.g., pump, storage containers, casing, valves, drills, or the like) that are accessible to the underwater vehicle. For example, the subsea navigation system may be used to monitor the relative position of the underwater vehicle relative to a tool on the skid and/or to control the underwater vehicle to access (e.g., approach or engage) the tool. The subsea navigation system disclosed herein may control and/or monitor the relative position of the underwater vehicle without determining an absolute position (e.g., on a global coordinate system or fixed or absolute coordinate system) of the reference elements, the skid, and/or the underwater vehicle, thereby reducing time and/or costs related to set up and operation of the navigation system. The embodiments disclosed herein relate generally to underwater vehicles to facilitate discussion; however, it should be understood that the disclosed systems may be adapted to control and/or monitor a relative position of any of a variety of movable subsea equipment, such as subsea implements (e.g., tools).

With the foregoing in mind, FIG. 1 is a schematic view of an embodiment of a subsea navigation system 10. As shown, the subsea navigation system 10 includes multiple reference elements 12 (e.g., transducers) that are configured to emit a signal (e.g., acoustic signal). Although four reference elements 12 are shown, it should be understood that any suitable number (e.g., 2, 3, 4, 5, 6, 7, 8, 9, 10 or more) of reference elements 12 may be provided. The multiple reference elements 12 may be coupled (e.g., fastened or mounted) to a skid 14 (e.g., frame, support structure, platform, or the like) that is configured to be positioned at a sea floor. In some embodiments, one or more of the multiple reference elements 12 may be coupled to a component 16 (e.g., tools or other equipment, such as a pump, storage containers, casing, valves, drills, or the like) that is mounted on the skid 14. In certain embodiments, one or more of the multiple reference elements 12 may be coupled to or positioned proximate to a connector (e.g., a connection point between the component 16 and an underwater vehicle). For example, a reference element 12 may be centered on a connector of the component 16 that is configured to receive or to couple to the underwater vehicle. In certain embodiments, one or more of the multiple reference elements 12 may be coupled to an actuator, valve actuator, electrical connector, mechanical connector, fluid connector, or the like. The multiple reference elements 12 may be positioned in a single plane or in different planes separated vertically relative to the skid 14 from one another.

As shown, the skid 14 includes an opening 15 that enables the skid 14 to be positioned about (e.g., to surround) a well at the sea floor. The position of each of the multiple reference elements 12 relative to one another, relative to the skid 14, and/or relative to the components 16 mounted on the skid 14 may be measured and determined prior to deploying the skid 14 to the sea floor. Data indicative of these relative positions may be stored (e.g., in a memory device). The skid 14 may include a rigid frame that enables the multiple reference elements 12 to remain fixed at respective locations on the skid 14 as the skid 14 moves from the sea surface to the sea floor.

The subsea navigation system 12 may also include a communication element 18 (e.g., transducer or acoustic detector) coupled to an underwater vehicle 20, such as an ROV or an AUV. The communication element 18 is configured to receive the signals from the multiple reference elements 12. Such a configuration enables a controller, such as a controller 22 (e.g., electronic controller having a processor 23 and a memory 25) within the underwater vehicle 20, to calculate (e.g., via triangulation or spherical navigation) a position of the underwater vehicle 20 relative to the multiple reference elements 12. Because the position of the multiple reference elements 12 relative to the skid 14 and/or the components 16 is known (e.g., predetermined, such as at the sea surface prior to deployment of the skid 14), the signals enable the controller 22 to determine the position of the underwater vehicle 20 relative to the skid 14 and/or the components 16. The controller 22 may be configured to guide the underwater vehicle 20 (e.g., via control signals to a drive system or a steering system) based on the determined position of the underwater vehicle 20 relative to skid 14 and/or the components 16. Thus, the absolute location and/or absolute orientation (e.g., on a global coordinate system) of the reference elements 12, the underwater vehicle 20, and/or the skid 14 is not calculated and is not utilized to guide the underwater vehicle 20.

As shown, the skid 14 includes a controller 26 (e.g., electronic controller). The controller 26 includes a processor, such as the illustrated microprocessor 28, and a memory 30. A power supply 32 may be configured to provide power to the multiple reference elements 12. In some embodiments, the reference elements 12 may be communicatively coupled (e.g., via electrical wires, wet-mate connectors, inductive couplers, or the like) to the controller 26. As discussed in more detail below, such a configuration may facilitate synchronization (e.g., clock synchronization or calibration) of the multiple reference elements 12, thereby enabling efficient and reliable navigation via one-way communication (e.g., emission of acoustic signals from the reference elements 12 to the communication element 18). For example, in some embodiments, the controller 26 may control the multiple reference elements 12 to emit respective signals simultaneously. The signals may be received at the communication element 18 of the underwater vehicle 20, and the controller 22 may then process the signals to determine the position of the underwater vehicle 20 relative to the skid 14 and/or the components 16 on the skid 14.

It should be understood that the reference elements 12 and the communication element 18 may have any suitable form and/or may communicate in any of a variety of manners to enable determination of the relative position of the underwater vehicle 20, including two-way communication. For example, in certain embodiments, the communication element 18 includes a transducer that is configured to emit an interrogation signal (e.g., acoustic wave), and the multiple reference elements 12 include transponders that are configured to emit a signal in response to receipt of the interrogation signal from the communication element 18. In such cases, the communication element 18 receives the signals and determines the relative position of the underwater vehicle 20 based on the signals.

By way of another example, in some embodiments, the communication element 18 of the underwater vehicle 20 may emit a signal (e.g., acoustic wave) that is detected by the multiple reference elements 12. In some such cases, the controller 26 of the skid 14 may be configured to determine the relative position of the underwater vehicle 20 based on the received signal. In some such cases, the controller 26 may initiate (e.g., via control signals) other actions based on the relative position of the underwater vehicle 20. For example, the controller 26 may be configured to open a garage door or make certain tools available for access by the underwater vehicle 20 as the underwater vehicle 20 approaches the skid 14 or a particular portion of the skid 14. Furthermore, in certain embodiments, the reference elements 12 and the communication element 18 are configured to send and/or receive optical signals, radiofrequency signals, or the like.

In some embodiments, the underwater vehicle 20 may be an ROV that is coupled to another vessel (e.g., surface vessel) via a tether 24 (e.g., control line). In such cases, the signals may be provided via the tether 24 to a controller at the vessel, which may then determine the relative position of the underwater vehicle 20, provide control signals to guide the underwater vehicle 20, and/or enable an operator to provide inputs to guide the underwater vehicle 20, for example.

In certain embodiments, the underwater vehicle 20 may be guided and/or tracked without determining an absolute position and/or an absolute orientation (e.g., global coordinates) of the reference elements 12, the skid 14, and/or the underwater vehicle 20. Such a configuration may reduce the time and/or costs associated with set up and operation as compared with traditional navigation systems (e.g., long-baseline systems or ultra-short baseline systems), while enabling reliable and efficient movement of the underwater vehicle 20 about the skid 14.

In some embodiments, the underwater vehicle 20 may be guided from a sea surface toward the skid 14 via a conventional long-baseline system and/or an ultra-short baseline system until the underwater vehicle 20 is within a threshold distance of the skid 14 (e.g., until communication is established between the communication element 18 of the underwater vehicle 20 and the reference elements 12 on the skid 14). Subsequently, the underwater vehicle 20 may be guided and/or tracked based on its relative position as disclosed herein.

Figure 2:
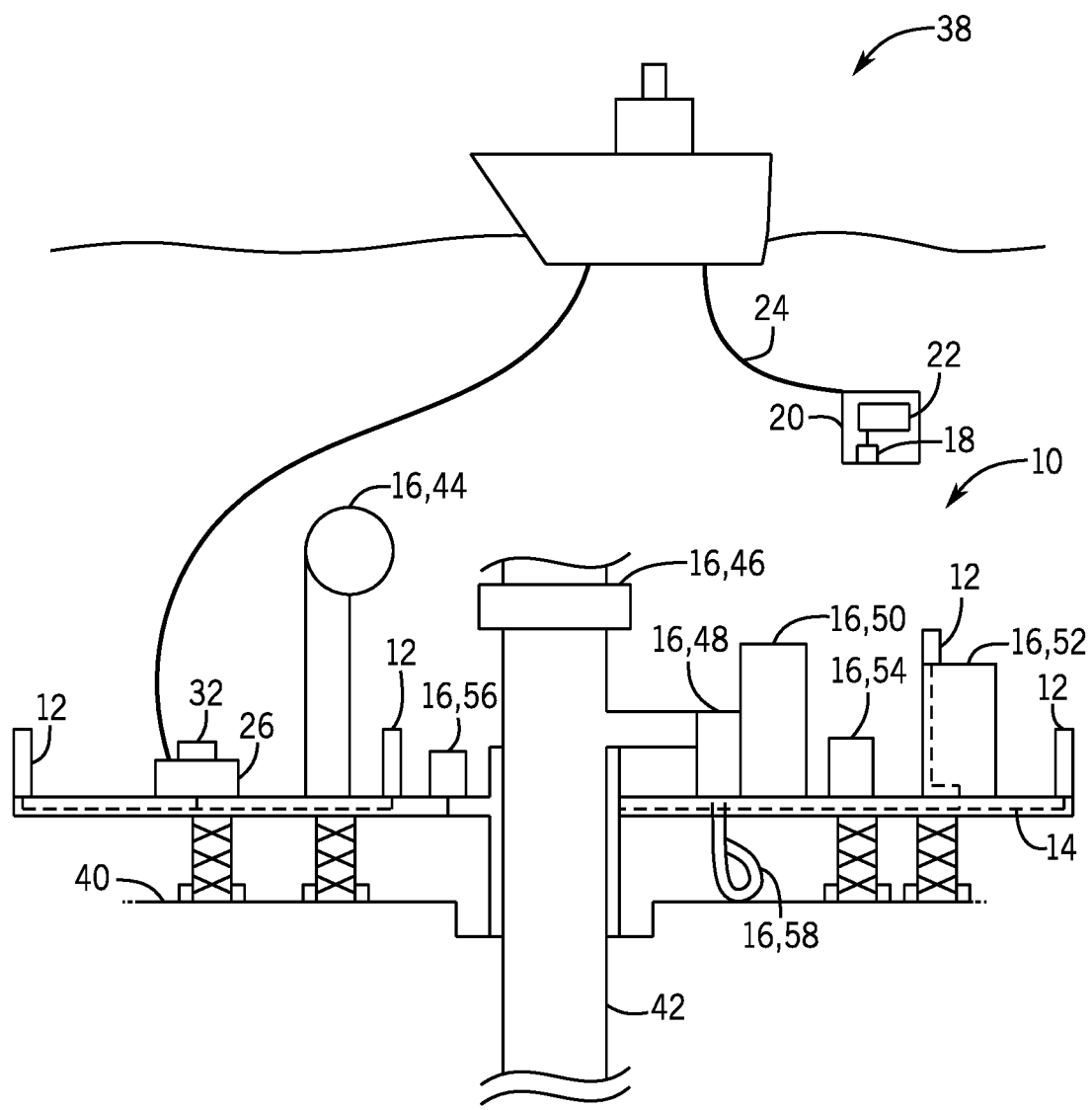
FIG. 2 is a schematic view of an embodiment of a subsea navigation system and a subsea hydrocarbon extraction system.

FIG. 2 illustrates a schematic view of the subsea navigation system 10 used with a seabed support system 38 that supports drilling operations, hydrocarbon production, and/or well shutdown operations from a sea floor 40. In the illustrated embodiment, the skid 14 is annular and extends circumferentially about a well 42. The well 42 may be drilled prior to placement of the skid 14 or after placement of the skid 14 on the sea floor 40. In the illustrated embodiment, the seabed support system 38 forms a kind of unmanned subsea village configured to supporting drilling, production, and/or shutdown operations associated with one or more wells 42. As shown, the skid 14 may support or include various components 16, such as a coiled tubing spool 44, blowout preventers (BOP) 46, water treatment systems 48, separation systems 50, garages 52, material storage containers 54, pumps 56, pipelines 58 (e.g., to the sea surface), or the like. These components 16 may each include a separate support structure or frame that is supported on the skid 14 at a predefined or known relative location and/or relative orientation (e.g., as measured or determined at the sea surface prior to deployment of the skid 14 to the sea floor 40).

The underwater vehicle 20 may be configured to manipulate various components 16. In certain embodiments, the components 16 may be accessed, controlled, operated, repaired, installed, retrieved, and/or exchanged by the underwater vehicle 20. In some embodiments, when the underwater vehicle 20 is not in use or is due for maintenance (e.g., battery charging, refueling) the underwater vehicle 20 may be relocated to the garage 52 that is configured to recharge batteries (e.g., via a power supply, such as the power supply 32), download data (e.g., to the controller 36), upload instructions (e.g., from the controller 36), synchronize clocks of the communication element 18 and the reference elements 12, or the like. The disclosed navigation system 10 may facilitate accurately and efficiently guiding the underwater vehicle 20 to a particular component 16 to enable the above-described actions.

As shown, the skid 14 includes the controller 26 and the power supply 32. In some embodiments, a control line 60 extends between a surface vessel 62 and the skid 14 and may be configured to exchange data with the controller 26 and/or provide power to the power supply 32. As shown, the reference elements 12 are communicatively coupled (e.g., via electrical wires, wet-mate connectors, inductive couplers, or the like) to the controller 26 and the power supply 32. Such a configuration may facilitate synchronization (e.g., clock synchronization or calibration) of the multiple reference elements 12. Other components 16 may also be coupled to the controller 26 and/or the power supply 32. For example, vehicle connectors within the garage 52 may be coupled to the controller 26 and/or the power supply 32 to enable recharging the underwater vehicle 20, synchronizing the communication element 18 with the multiple reference elements 12, and/or exchanging data or instructions, for example.

The components 16 illustrated in FIG. 2 are merely exemplary and it should be understood that the navigation system 10 may be used with various hydrocarbon extraction systems 38 having any of a variety of components 16. Additionally, it should be understood that the skid 14 may have any number of geometries suitable for drilling operations and that accommodate the sea floor terrain. Moreover, the skid 14 may support and/or surround multiple wells 42.

Figure 3:
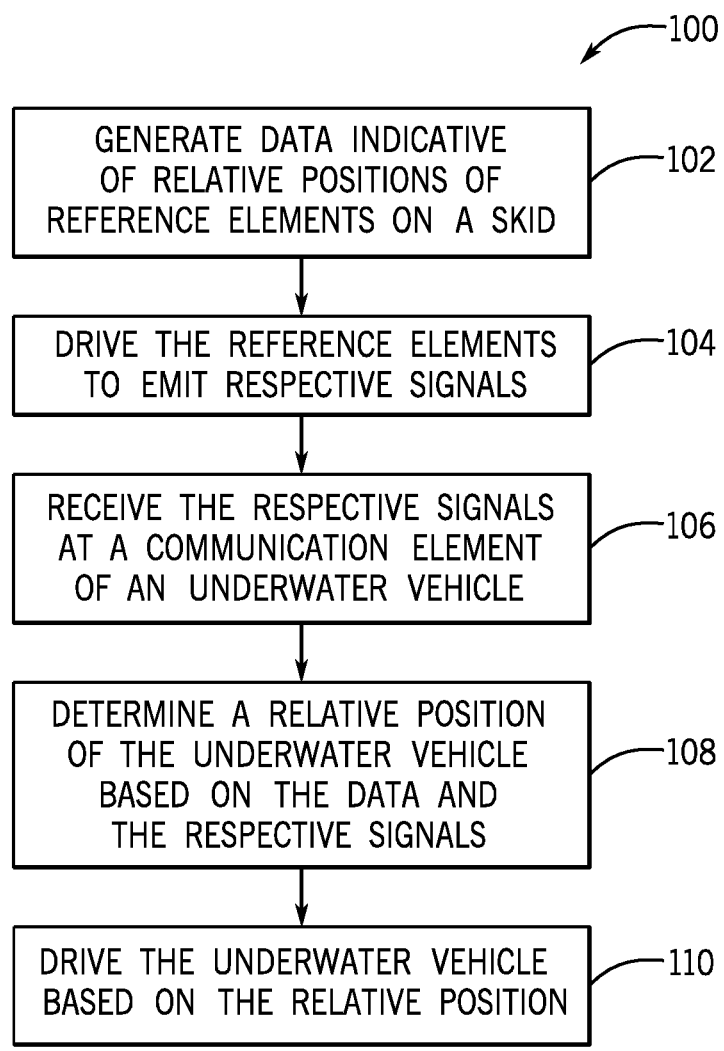
FIG. 3 is a flow diagram of an embodiment of a method for controlling an underwater vehicle.

FIG. 3 is a flow chart illustrating an embodiment of a method 100 (e.g., computer-implemented method) for monitoring and controlling the underwater vehicle 20. The method 100 includes various steps represented by blocks. It should be noted that the method 100 may be performed as an automated procedure by a system, such as the subsea navigation system 10. Although the flow chart illustrates the steps in a certain sequence, it should be understood that the steps may be performed in any suitable order and certain steps may be carried out simultaneously, where appropriate. Further, certain steps or portions of the method 100 may be omitted and other steps may be added. The steps or portions of the method 100 may be performed by one device or separate devices. For example, a first portion of the method 100 may be performed by the controller 22 of the underwater vehicle 20, while a second portion of the method 100 may be performed by the controller 26 of the skid 14.

In step 102, data indicative of the position of each of the reference elements 12 relative to one another, the skid 14, and/or the components 16 on the skid 14 may be determined. As discussed above, the data may be generated at the sea surface (e.g., via measurements and calculations, such as by an electronic controller having a processor and a memory) prior to deployment of the skid 14 to the sea floor 40.

In step 104, a controller, such as the controller 26, causes the reference elements 12 to emit signals (e.g., acoustic waves). As discussed above, the controller 26 may be configured to drive the reference elements 12 to emit respective signals simultaneously. In step 106, the respective signals are received at the communication element 18 of the underwater vehicle 20. In step 108, a controller, such as the controller 22, may determine the relative position of the underwater vehicle 20 relative to the skid 14 and/or the components 16 on the skid 14 based on the data generated in step 102 and the respective signals received at step 106. In step 110, a controller, such as the controller 22, may provide a control signal to drive the underwater vehicle 20 based on the determined relative position. For example, the control signal may cause the underwater vehicle 20 to move toward a particular component 16 to enable the underwater vehicle 20 to access, control, operate, repair, replace, and/or remove the component 16, for example.

As discussed above, the underwater vehicle 20 may be guided and/or tracked without determining an absolute position and/or an absolute orientation (e.g., global coordinates) of the reference elements 12, the skid 14, and/or the underwater vehicle 20. Such a configuration may reduce the time and/or costs associated with set up and operation as compared with traditional navigation systems, while enabling reliable and efficient movement of the underwater vehicle 20 about the skid 14.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

I claim:

1. A navigation system, comprising:
a support structure assembly comprising a frame that supports a plurality of components that are configured to facilitate at least one of drilling, production, or shutdown operations associated with one or more wells formed in a sea floor, wherein the frame supports a plurality of transducers that are configured to emit a plurality of reference signals, the frame supports the plurality of components and the plurality of transducers at fixed locations relative to the frame, and the support structure assembly is configured to be lowered as a unit from a sea surface to the sea floor;
a transducer coupled to a movable subsea vessel, wherein the transducer is configured to receive the plurality of reference signals; and
a first controller comprising a first processor and a first memory, wherein the first processor is configured to access stored data indicative of respective fixed positions of the plurality of transducers on the support structure assembly, to receive a plurality of reference signals indicative of respective distances between the movable subsea vessel and the plurality of transducers, to determine a position of the movable subsea vessel relative to the support structure assembly based on the stored data and the plurality of reference signals; and to output a first control signal to control at least one of the plurality of components supported by the frame based on the position of the movable subsea vessel relative to the frame; and a second controller comprising a second processor and a second memory, wherein the second processor is configured to receive a signal indicative of the position of the movable subsea vessel relative to the support structure assembly or to determine the position of the movable subsea vessel relative to the support structure assembly based on the stored data and the plurality of reference signals; and to output a second control signal to determine a position of the movable subsea vessel relative to at least one of the plurality of components based on the plurality of reference signals and the data, and drive the movable subsea vessel based on the position of the movable subsea vessel relative to the support structure assembly without receiving or calculating an absolute location of the at least one of the plurality of components, the movable subsea vessel, the frame, and the plurality of transducers on a global coordinate system;

wherein the first controller couples to the support structure assembly, and wherein the first controller outputs a second signal to drive the movable subsea vessel in response to the movable subsea vessel being within a threshold distance of the support structure assembly.

2. The system of claim 1, wherein the plurality of transducers are configured to provide the plurality of reference signals in response to an interrogation signal received from the transducer coupled to the movable subsea vessel.

3. The system of claim 1, wherein the plurality of reference signals comprise acoustic waves.

4. The system of claim 1, wherein the movable subsea vessel comprises a remotely operated vehicle or an autonomous underwater vehicle.

5. The system of claim 1, wherein the first controller is positioned at a surface vessel coupled to the movable subsea vessel via a control line.

6. The system of claim 1, comprising the movable subsea vessel, wherein the second controller is positioned within the movable subsea vessel.

7. The system of claim 1, wherein the second controller is configured to output a control signal to drive the movable subsea vessel based on the position of the movable subsea vessel relative to the at least one of the plurality of components.

8. The system of claim 1, comprising a power source supported by the frame and configured to power the plurality of transducers.

9. The system of claim 1, comprising a transducer controller supported by the frame and configured to synchronize emission of the plurality of reference signals by the plurality of transducers.

10. A method, comprising:
storing, in a database accessible by a first processor of a first controller, data indicative of respective fixed positions of a plurality of transducers relative to a frame of a support structure assembly prior to deployment of the support structure assembly to a sea floor;
accessing, using the first processor, the data indicative of the respective fixed positions of the plurality of transducers relative to the frame of the support structure assembly;
receiving, at the first processor, a plurality of reference signals indicative of respective distances between a movable subsea vessel and the plurality of transducers;
determining, using the first processor, a position of the movable subsea vessel relative to the frame based on the data and the plurality of reference signals; and
outputting, using the first processor a first control signal to control at least one of a plurality of components supported by the frame based on the position of the movable subsea vessel relative to the frame; and
receiving, at a second processor of a second controller, a signal indicative of the position of the movable subsea vessel relative to the frame or of the position of the movable subsea vessel relative to the frame based on the data and the plurality of reference signals;
outputting using the second processor a second control signal to determine and a position of the movable subsea vessel relative to the at least one of the plurality of components based on the plurality of reference signals and the data, and drive the movable subsea vessel based on the position of the movable subsea vessel relative to the frame without receiving or calculating an absolute location of the at least one of the plurality of components, the movable subsea vessel, the frame, and the plurality of transducers on a global coordinate system;

wherein the first controller couples to the frame, and wherein the first controller outputs a second signal to drive the movable subsea vessel in response to the movable subsea vessel being within a threshold distance of the support structure assembly.

11. The method of claim 10, comprising, using a transducer coupled to the movable subsea vessel, emitting an interrogation signal from the transducer, and providing, using the plurality of transducers, the plurality of reference signals in response to the interrogation signal.

12. The method of claim 10, comprising synchronizing emission of the plurality of reference signals by the plurality of transducers using the first controller supported by the frame and coupled to the plurality of transducers.

13. A system, comprising:
a first controller comprising a first processor and a first memory, wherein the first processor is configured to:
access stored data indicative of respective fixed positions of a plurality of transducers on a support structure;
receive a plurality of reference signals indicative of respective distances between a movable subsea vessel and the plurality of transducers;
determine a position of the movable subsea vessel relative to the support structure based on the stored data and the plurality of reference signals; and
output a first control signal to control at least one component supported by the support structure based on the position of the movable subsea vessel relative to the support structure; and
a second controller comprising a second processor and a second memory, wherein the second processor is configured to:
receive a signal indicative of the position of the movable subsea vessel relative to the support structure or to determine the position of the movable subsea vessel relative to the support structure based on the stored data and the plurality of reference signals; and output a second control signal to drive the movable subsea vessel based on the position of the movable subsea vessel relative to the support structure without receiving or calculating an absolute location of the support structure, the plurality of transducers, the at least one component, and the movable subsea vessel on a global coordinate system, wherein the first controller couples to the support structure, and wherein the first controller outputs a second signal to drive the movable subsea vessel in response to the movable subsea vessel being within a threshold distance of the support structure.

14. The system of claim 13, wherein the system comprises the support structure, the plurality of transducers, the at least one component, and the movable subsea vessel.

15. The system of claim 13, wherein the at least one component comprises a tool, and the first control signal operates to make the tool available for access by the movable subsea vessel.

* * * * *